US011433796B2

(12) United States Patent
Sakurai

(10) Patent No.: US 11,433,796 B2
(45) Date of Patent: Sep. 6, 2022

(54) BOARDING HANDRAIL

(71) Applicant: TOYOTA JIDOSHA KABUSHIKI KAISHA, Aichi-ken (JP)

(72) Inventor: Hideyuki Sakurai, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/352,358

(22) Filed: Jun. 21, 2021

(65) Prior Publication Data

US 2022/0072987 A1    Mar. 10, 2022

(30) Foreign Application Priority Data

Sep. 4, 2020 (JP) .............................. JP2020-149218

(51) Int. Cl.
*B60N 3/02* (2006.01)
(52) U.S. Cl.
CPC .................................... *B60N 3/023* (2013.01)
(58) Field of Classification Search
CPC  B60N 3/023; B60N 3/026; A61L 2/20; A61L 2202/12; A61L 2/16
USPC ........................................................ 296/1.02
See application file for complete search history.

(56) References Cited

U.S. PATENT DOCUMENTS

| | | | | |
|---|---|---|---|---|
| 6,974,134 B1 * | 12/2005 | Macri | ................... | E05B 1/0015 16/412 |
| 10,457,182 B2 * | 10/2019 | McKinnon | ............. | B60N 3/026 |
| 10,946,780 B2 * | 3/2021 | Bacon | ................... | E05B 1/0015 |
| 11,046,226 B1 * | 6/2021 | Younce | ................... | B60N 3/023 |
| 2007/0204437 A1 * | 9/2007 | Hartmann | .............. | B60N 3/023 16/444 |
| 2014/0338153 A1 * | 11/2014 | Dopatka | ................ | B61D 19/02 16/110.1 |
| 2021/0316020 A1 * | 10/2021 | Stankus | .................... | A61L 2/10 |

FOREIGN PATENT DOCUMENTS

| | | | | | |
|---|---|---|---|---|---|
| CN | 216139991 | U | * | 3/2022 | ............... B60N 3/02 |
| DE | 202010004908 | U1 | * | 7/2010 | ............... A61L 2/26 |
| EP | 3950016 | A2 | * | 2/2022 | ............... B60N 3/02 |
| GB | 2446054 | A | * | 7/2008 | ............... A61L 2/18 |
| JP | 202063050 | A | | 4/2020 | |
| WO | WO-2021255543 | A1 | * | 12/2021 | |

OTHER PUBLICATIONS

Unpublished U.S. Appl. No. 17/029,044, filed Sep. 23, 2020, 26pp.

* cited by examiner

*Primary Examiner* — Jason S Morrow
(74) *Attorney, Agent, or Firm* — Hauptman Ham, LLP

(57) ABSTRACT

A boarding handrail includes: a base supported by a support member provided on a periphery of an entrance of a vehicle; a handrail main body provided on the base and capable of being grasped by a passenger who gets on or off the vehicle through the entrance; and a moving member movably fitted on the handrail main body. The moving member has a self-propelled device that rolls over an outer circumferential surface of the handrail main body so as to cause the moving member to move in an axial direction while rotating on its axis, and an irradiation device that irradiates the outer circumferential surface of the handrail main body with ultraviolet light.

10 Claims, 16 Drawing Sheets

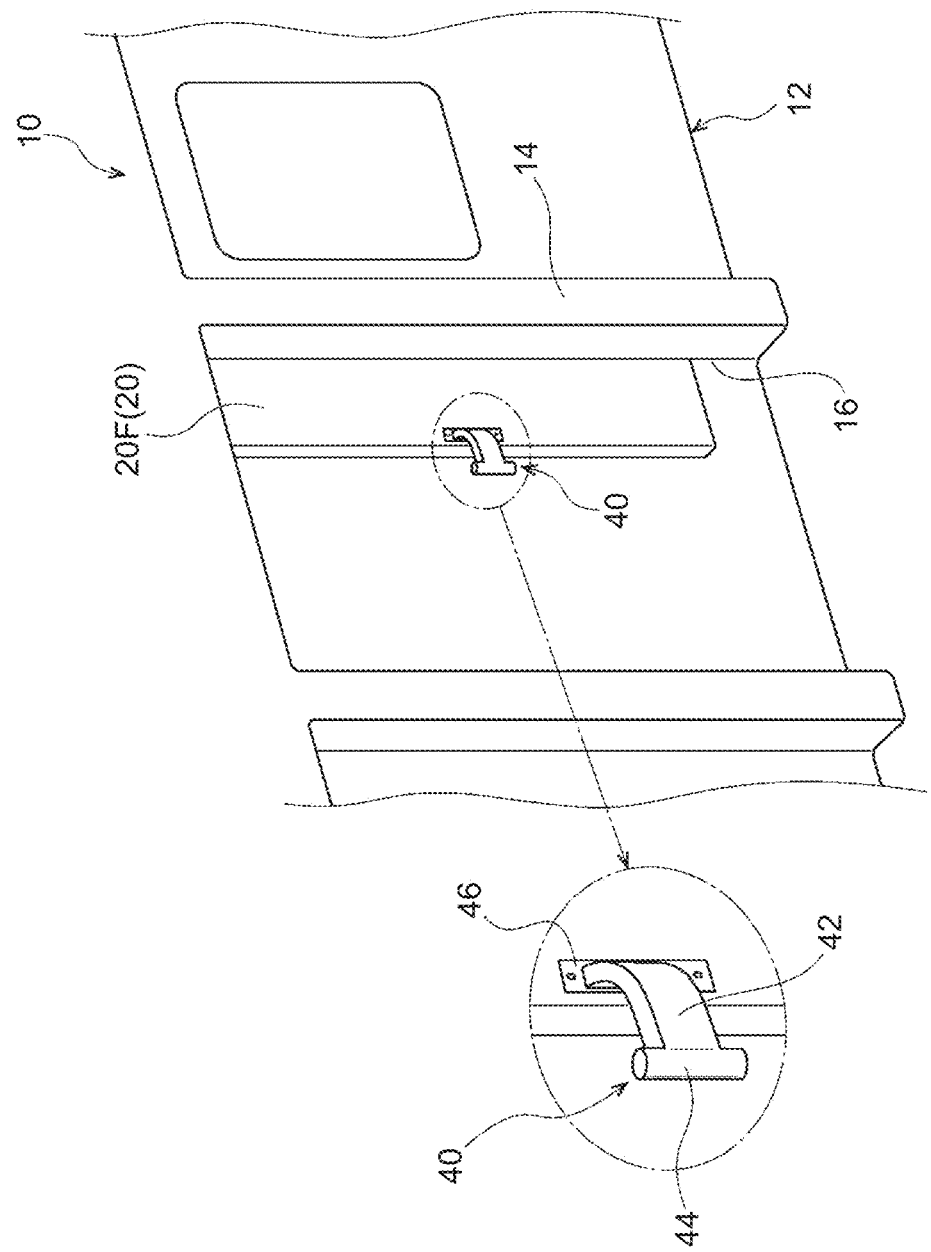

BOARDING HANDRAIL

CROSS-REFERENCE TO RELATED APPLICATION

This application claims priority to Japanese Patent Application No. 2020-149218 filed on Sep. 4, 2020, incorporated herein by reference in its entirety.

BACKGROUND

1. Technical Field

The present disclosure relates to a boarding handrail.

2. Description of Related Art

There is a hitherto known hanging strap disinfecting device (e.g., see Japanese Patent Application Publication No. 2020-063050). This device includes a light-blocking cover that is provided over an upper part of a handle of a hanging strap, and light emitting elements that are provided inside the cover and capable of emitting ultraviolet light, and disinfects the handle, which is rotatable in a circumferential direction, by irradiating the upper part of the handle covered by the cover with ultraviolet light.

SUMMARY

In the case of a hanging strap, since a passenger grasps the hanging strap by reaching out his or her hand from below, a disinfecting device permanently equipped with a cover as described above also works. In the case of a boarding handrail provided on a periphery of an entrance of a bus etc., however, passengers grasp the boarding handrail from various directions. Thus, a disinfecting device including a cover as described above that is permanently installed on the boarding handrail would make the boarding handrail difficult to grasp and hinder its original function as a boarding handrail.

It is therefore an object of the present disclosure to obtain a boarding handrail that can be disinfected without being hindered from functioning as a boarding handrail.

To achieve this object, a boarding handrail described in claim 1 according to the present disclosure includes: a base supported by a support member provided on a periphery of an entrance of a vehicle; a handrail main body provided on the base and capable of being grasped by a passenger who gets on or off the vehicle through the entrance; and a moving member movably fitted on the handrail main body. The moving member has a self-propelled device that rolls over an outer circumferential surface of the handrail main body to cause the moving member to move in an axial direction while rotating on its axis, and an irradiation device that irradiates the outer circumferential surface of the handrail main body with ultraviolet light.

According to the disclosure described in claim 1, the moving member moves in the axial direction of the handrail main body while rotating on its axis by means of the self-propelled device, and in the process sterilizes the outer circumferential surface of the handrail main body by irradiating the outer circumferential surface with ultraviolet light by means of the irradiation device. Thus, the boarding handrail is disinfected. Since this configuration has the moving member movably provided on the handrail main body, when not disinfecting the boarding handrail, the moving member can be disposed in a stationary state, for example, at an initial position on the handrail main body. Therefore, the function of a boarding handrail is not hindered.

A boarding handrail described in claim 2 according to the present disclosure includes: a base supported by a support member provided on a periphery of an entrance of a vehicle; a handrail main body provided on the base and capable of being grasped by a passenger who gets on or off the vehicle through the entrance; and a moving member movably fitted on the handrail main body. The moving member has a self-propelled device that rolls over an outer circumferential surface of the handrail main body to cause the moving member to move in an axial direction while rotating on its axis, and a supply device that supplies a disinfectant liquid to the outer circumferential surface of the handrail main body.

According to the disclosure described in claim 2, the moving member moves in the axial direction of the handrail main body while rotating on its axis by means of the self-propelled device, and in the process sterilizes the outer circumferential surface of the handrail main body by supplying the disinfectant liquid to the outer circumferential surface by means of the supply device. Thus, the boarding handrail is disinfected. Since this configuration has the moving member movably provided on the handrail main body, when not disinfecting the boarding handrail, the moving member can be disposed in a stationary state, for example, at an initial position on the handrail main body. Therefore, the function of a boarding handrail is not hindered.

A boarding handrail described in claim 3 is the boarding handrail described in claim 2, wherein the moving member has a wiping device that wipes the outer circumferential surface of the handrail main body before the disinfectant liquid is supplied to the outer circumferential surface.

According to the disclosure described in claim 3, the wiping device provided in the moving member wipes the outer circumferential surface of the handrail main body before the disinfectant liquid is supplied to the outer circumferential surface. Thus, the disinfectant liquid is effectively supplied to the outer circumferential surface of the handrail main body from which contamination has been removed.

A boarding handrail described in claim 4 is the boarding handrail described in claim 3, wherein the moving member has a detection device that detects contamination of the outer circumferential surface of the handrail main body, and the moving member is configured to return to an initial position when the contamination is no longer detected by the detection device.

According to the disclosure described in claim 4, the moving member returns to the initial position when contamination of the outer circumferential surface of the handrail main body is no longer detected by the detection device provided in the moving member. Thus, unnecessary movement of the moving member is prevented and battery consumption is reduced.

A boarding handrail described in claim 5 is the boarding handrail described in any one of claims 1 to 4, wherein the moving member is configured to reverse a moving direction upon reaching a predetermined position on the handrail main body.

According to the disclosure described in claim 5, the moving member reverses the moving direction upon reaching a predetermined position on the handrail main body. This means that the moving member moves back and forth along the handrail main body. Thus, the boarding handrail is less likely to partially fail to be disinfected.

A boarding handrail described in claim 6 is the boarding handrail described in any one of claims 1 to 5, wherein the boarding handrail is configured such that at least the self-propelled device is wirelessly supplied with electricity through a power transmission member that is passed through the base and the handrail main body.

According to the disclosure described in claim 6, at least the self-propelled device is wirelessly supplied with electricity through the power transmission member that is passed through the base and the handrail main body. Thus, compared with when the self-propelled device is supplied with electricity from a battery, there is no need to worry about a dead battery.

A boarding handrail described in claim 7 is the boarding handrail described in any one of claims 1 to 6, wherein the support member supports the base so as to allow the base to turn with an axial direction oriented in a vehicle body up-down direction. The handrail main body is configured to protrude toward the outside of the vehicle by turning around a rotating shaft of the support member as a door acts to open the entrance, and to be housed inside the vehicle by turning around the rotating shaft of the support member as the door acts to close the entrance.

According to the disclosure described in claim 7, the handrail main body protrudes toward the outside of the vehicle as the door acts to open the entrance, and is housed inside the vehicle as the door acts to close the entrance. This boarding handrail does not protrude toward the inside of the vehicle (the vehicle cabin side) when assuming a retracted posture. Thus, the boarding space is less restricted by the boarding handrail.

As has been described above, the present disclosure makes it possible to disinfect a boarding handrail without hindering it from functioning as a boarding handrail.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a perspective view showing a sliding member that is slidably held by a rail of the boarding handrail according to the first embodiment;

DETAILED DESCRIPTION OF EMBODIMENTS

Figure 1:
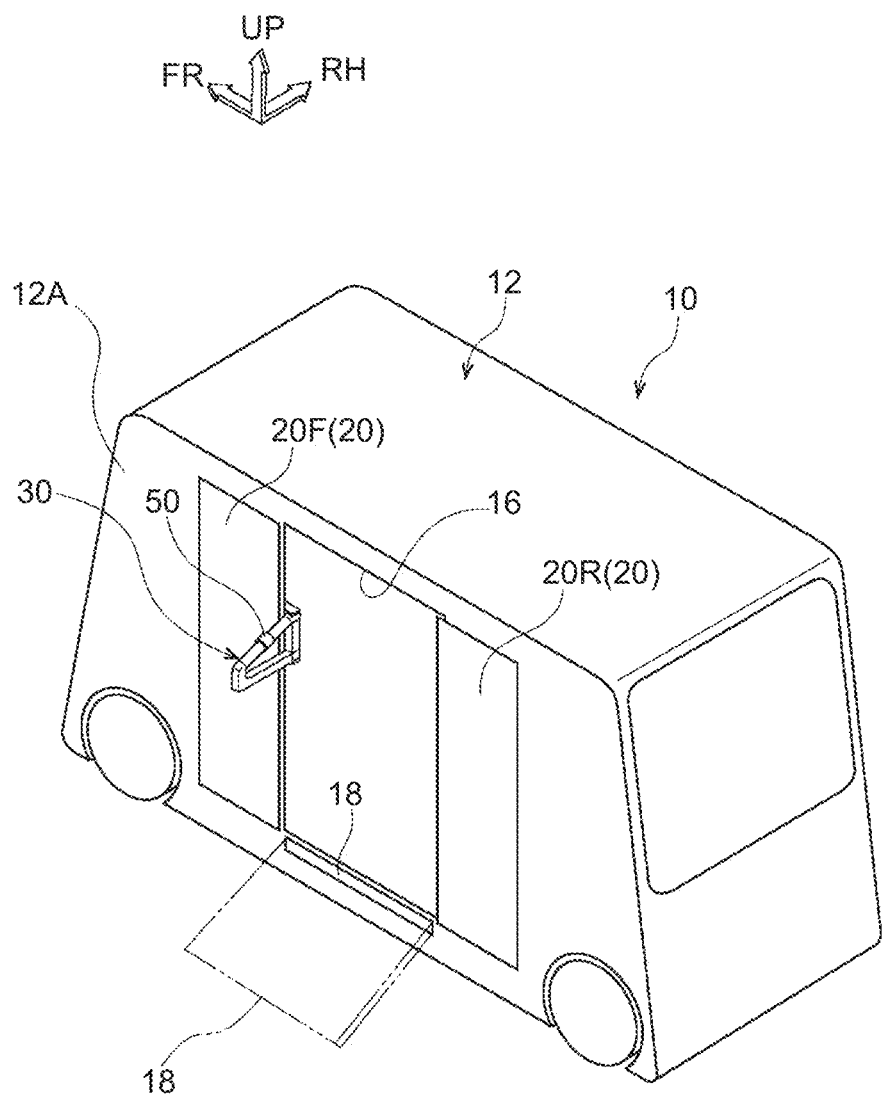
FIG. 1 is a perspective view showing a bus equipped with a boarding handrail according to a first embodiment.

Embodiments according to the present disclosure will be described in detail below based on the drawings. A boarding handrail 30 according to the embodiments is suitably provided in a small bus 10 that is one example of passenger-carrying cars as a vehicle (see FIG. 1). (The term "bus" here covers vehicles used for Mobility as a Service (MaaS) represented by a self-driving bus.)

For the convenience of description, arrows UP, FR, LH, and RH shown as necessary in the drawings indicate directions toward a vehicle body upper side, a vehicle body front side, a vehicle body left side, and a vehicle body right side, respectively, of the bus 10. Unless otherwise noted, the directions of up and down, front and rear, and left and right mentioned in the following description mean up and down in a vehicle body up-down direction, front and rear in a vehicle body front-rear direction, and left and right in a vehicle body left-right direction (vehicle width direction).

First Embodiment

First, a first embodiment will be described. As shown in FIG. 1, an entrance 16 having a rectangular shape as seen in a side view is formed in a left side wall (one side wall) of a vehicle body 12 of the bus 10, at a substantially central part in the front-rear direction. The bus 10 is provided with a sliding door 20 as a door that opens and closes the entrance 16.

The sliding door 20 is composed of a front-side door half 20F and a rear-side door half 20R each having a rectangular shape of which the length in the up-down direction is longer than the length in the front-rear direction as seen in a side view. The sliding door 20 is configured to be able to open and close the entrance 16 as the front-side door half 20F and the rear-side door half 20R slide (move) synchronously along an outer wall surface 12A of the bus 10 in directions toward and away from each other.

Elastic bodies 22 (see FIG. 12), such as rubber, are attached to end surfaces of the door halves 20F, 20R on inner sides in the front-rear direction (in other words, a rear end surface of the door half 20F and a front end surface of the door half 20R) that come into contact with each other when closing the entrance 16, along the entire end surfaces in the up-down direction. The door halves 20F, 20R close the entrance 16 by bringing their respective elastic bodies 22 into contact with each other so as to elastically deform.

Figure 13:
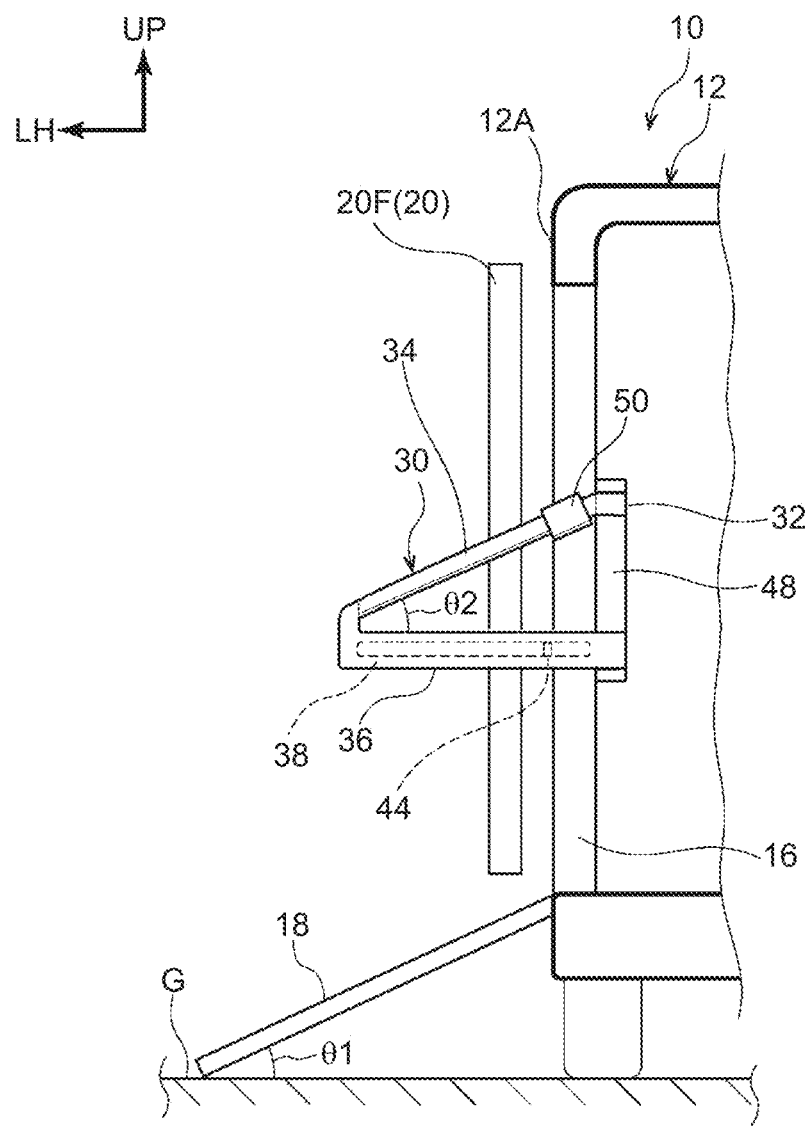
FIG. 13 is a rear view showing a deployed posture of the boarding handrail according to the first embodiment.

As shown in FIG. 1, a slope 18 that can be protruded to the outside of the vehicle is housed in the vehicle body 12, under the entrance 16 (e.g., under a floor panel). The slope 18 has a flat plate shape and is configured to be electrically operated to be pulled out and housed. As shown in FIG. 13, when pulled out, the slope 18 is disposed at a predetermined inclination angle θ1 by having a leading end thereof in a pull-out direction supported on a road surface G.

As shown in FIG. 1, when the sliding door 20 (the door half 20F and the door half 20R) slides (moves) and opens the entrance 16, a boarding handrail 30 made of fiber-reinforced resin, for example, protrudes from a predetermined position in the entrance 16 in the up-down direction (height direction) toward an outer side in the vehicle width direction.

Figure 2:
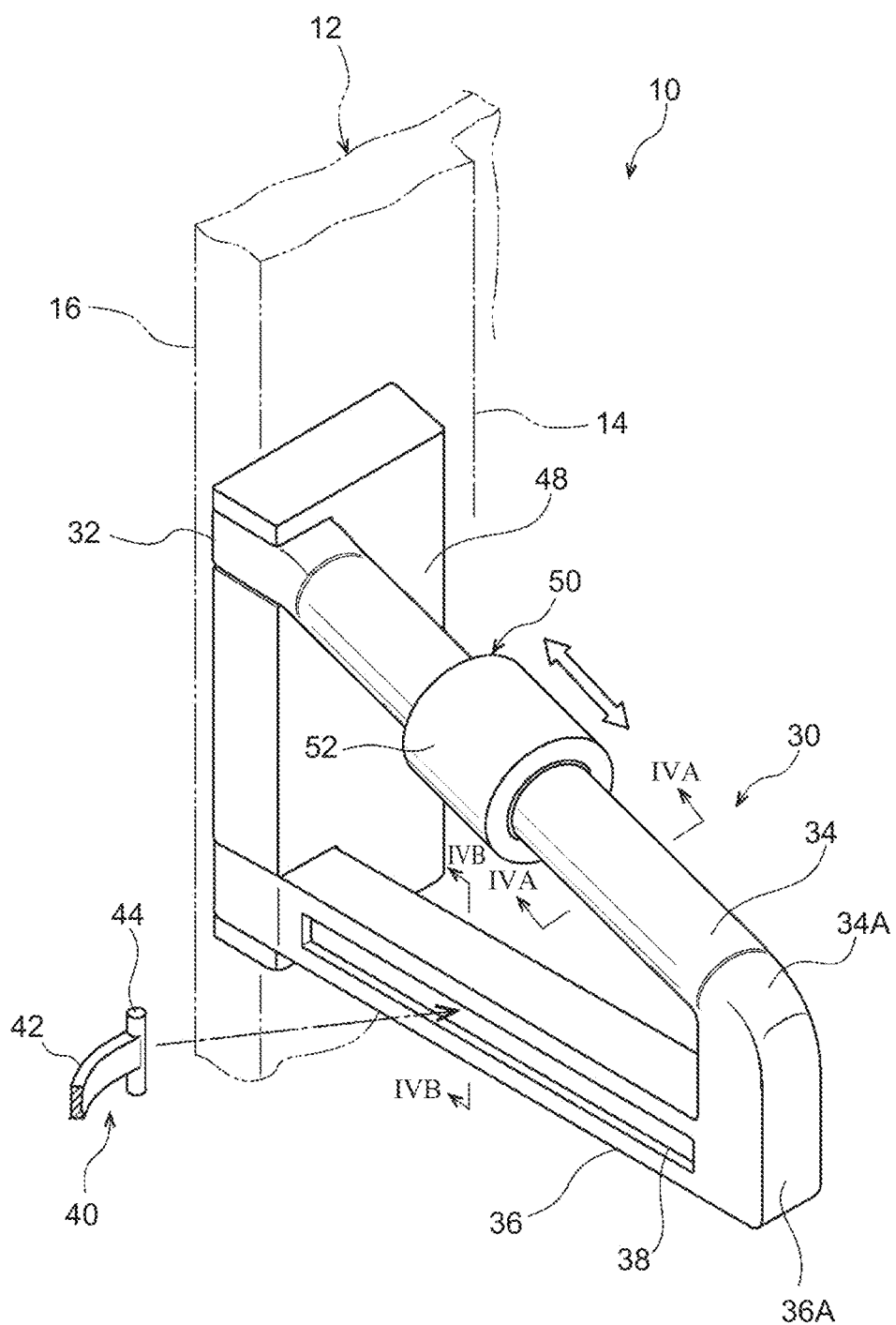
FIG. 2 is a perspective view showing the boarding handrail according to the first embodiment.
Figure 5:
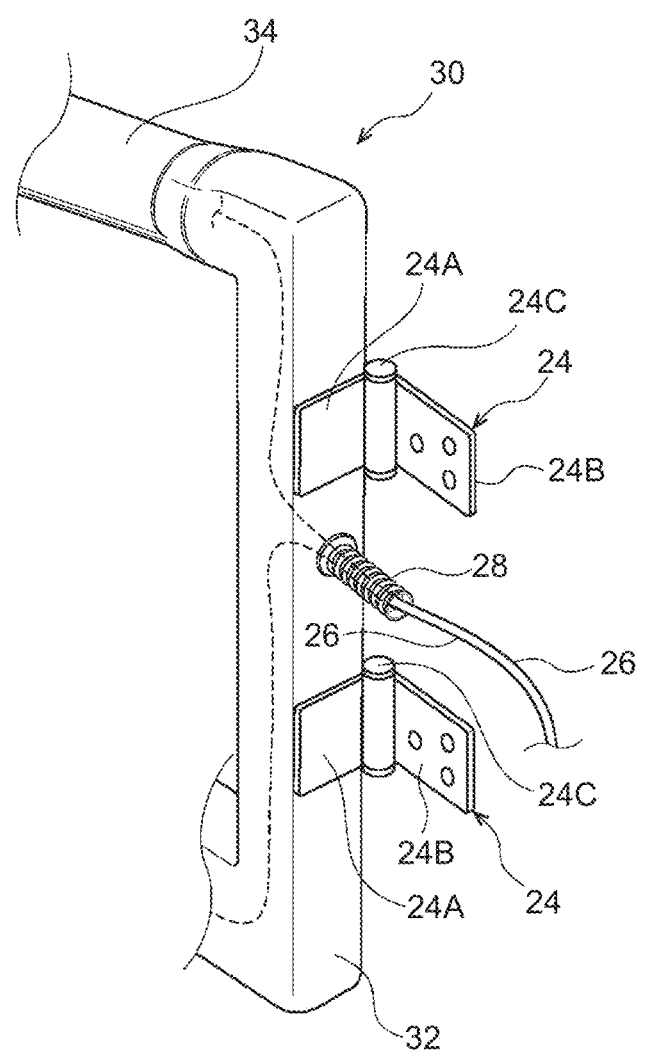
FIG. 5 is a perspective view showing part of a power transmission line that supplies electricity to a cleaner fitted on the boarding handrail according to the first embodiment.

Specifically, as shown in FIG. 2 and FIG. 5, the boarding handrail 30 includes a substantially rectangular columnar base 32, a handrail main body 34 of which one end is integrally provided at an upper part of an outer peripheral surface of the base 32, and a rail 36 of which one end is integrally provided at a lower part of the outer peripheral surface of the base 32. The other end (hereinafter referred to as a "leading end 34A") of the handrail main body 34 and the other end (hereinafter referred to as a "leading end 36A") of the rail 36 are integrally joined together.

As shown in FIG. 5, the base 32 of the boarding handrail 30 is supported by a pair of upper and lower metal hinges 24 as support members that are provided on a periphery of the entrance 16 of the bus 10 (e.g., on an inner wall surface of a pillar 14) such that the base 32 can turn with an axial direction oriented in the up-down direction.

That is, one end part 24A of each hinge 24 is firmly mounted on an outer wall surface of the base 32 with an adhesive or the like, while the other end part 24B of each hinge 24 is firmly mounted on the inner wall surface of the pillar 14 with a plurality of bolts or the like. Thus, the boarding handrail 30 can turn 90 degrees or more around rotating shafts 24C of the hinges 24 as seen in a plan view.

An insertion opening (not shown) for a power transmission line 26 as a power transmission member is formed at a central part of the base 32 in the up-down direction (between the upper hinge 24 and the lower hinge 24). The power transmission line 26 is routed from a battery (not shown) installed in the bus 10 so as to pass through the inside of the pillar 14.

Then, the power transmission line 26 is inserted into the insertion opening of the base 32 through a supply opening (not shown) formed in the inner wall surface of the pillar 14, passes through the inside of the base 32, the inside of the handrail main body 34, and the inside of the rail 36, and is led out through the insertion opening of the base 32. Thus, the power transmission line 26 is annularly routed through the inside of the boarding handrail 30.

The insertion opening of the base 32 is covered with a bellows-shaped rubber boot 28 that is fitted on two portions of the power transmission line 26. The hinges 24, a part of the power transmission line 26 exposed between the supply opening and the insertion opening, and the boot 28 are covered with a rectangular box-shaped cover body 48 (see FIG. 2) mounted on the pillar 14.

Figure 4A:
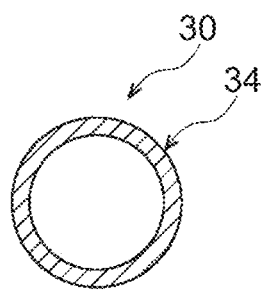
FIG. 4A is a sectional view taken along line IVA-IVA of FIG. 2 and seen in the arrow direction.

As shown in FIG. 4A, the handrail main body 34 has a cylindrical shape (a circular shape in cross-section). As shown in FIG. 2 and FIG. 13, the handrail main body 34 extends from the upper part of the base 32 toward an obliquely lower side. Thus, the handrail main body 34 is disposed so as to be inclined relatively to a horizontal direction, and a right-angled triangle is formed by the handrail main body 34, the base 32, and the rail 36. An inclination angle θ2 of the handrail main body 34 relative to the horizontal direction is set to an inclination angle roughly equal to the inclination angle θ1 of the slope 18 (see FIG. 13).

As shown in FIG. 2 and FIG. 13, the rail 36 extends in a horizontal direction and integrally couples a lower part of the base 32 and the leading end 34A of the handrail main body 34 together. The rail 36 slidably holds a sliding member 40 (see FIG. 3) that is mounted at an end of, for example, the door half 20F of the sliding door 20 on the inner side in the front-rear direction.

Figure 4B:
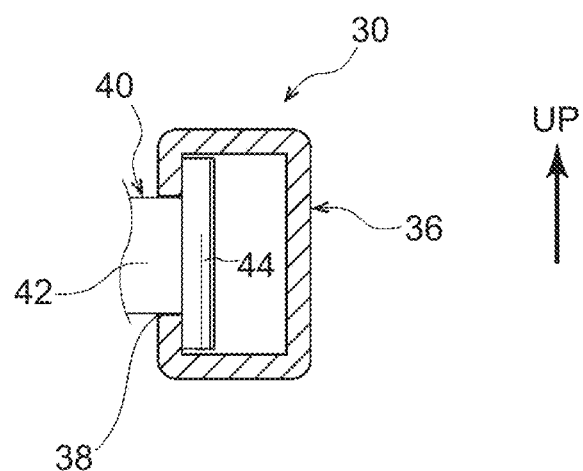
FIG. 4B is a sectional view taken along line IVB-IVB of FIG. 2 and seen in the arrow direction, showing a state where the sliding member is held by the rail.

As shown in FIG. 4B, the rail 36 has a rectangular tubular shape (a rectangular shape in cross-section) with the long sides oriented in the up-down direction. As shown in FIG. 2, a slit 38 communicating with the inside of the rail 36 and having a predetermined length along an extension direction (longitudinal direction) thereof is formed in one side wall of the rail 36 (the side wall that faces the front side in a deployed posture to be described later and faces the outer side in the vehicle width direction in a retracted posture to be described later), at a substantially central part in the up-down direction. Since the rail 36 is not to be grasped by passengers, the rail 36 need not have a circular cross-section.

As shown in FIG. 3, the sliding member 40 has a substantially T-shape as seen in a side view. That is, the sliding member 40 has a main body 42 that has a curved plate shape as seen in a plan view, a substantially columnar fitting part 44 that protrudes in the up-down direction from a leading end of the main body 42 (has an axial direction oriented in the up-down direction), and a flat plate-shaped fixing part 46 that is formed at a base end of the main body 42 on the opposite side from the fitting part 44.

The sliding member 40 is mounted to the rail 36 before the fixing part 46 is mounted to the door half 20F. Specifically, the fitting part 44 of the sliding member 40 is held laterally (with the axial direction oriented in a horizontal direction) and passed through the slit 38 of the rail 36 and then turned 90 degrees. Thus, as shown in FIG. 4B, the fitting part 44 of the sliding member 40 is fitted in the rail 36 so as to be slidable in a longitudinal direction of the rail 36, without coming off the rail 36.

Therefore, the width of the slit 38 (the clearance in the up-down direction) is larger than the outside diameter of the fitting part 44 and equal to or slightly larger than the width of the main body 42 of the sliding member 40 (the length of the fitting part 44 along the axial direction as seen in a side view). After the fitting part 44 of the sliding member 40 is fitted in the rail 36, the fixing part 46 thereof is mounted to the end of the door half 20F on the inner side in the front-rear direction by screw fastening or the like. Thus, the rail 36 is supported also by the sliding member 40.

As shown in FIG. 2 and FIG. 6 to FIG. 8, a cleaner 50 as a moving member is movably fitted on the handrail main body 34. The cleaner 50 has a cylindrical main body 52 with a predetermined thickness, and the inside of the main body 52 is hollow. The inside diameter of the main body 52 is slightly larger than the outside diameter of the handrail main body 34.

Inside the main body 52 constituting a part of the cleaner 50, a self-propelled device 54 is provided that rolls over an outer circumferential surface of the handrail main body 34 and thereby causes the main body 52 to move along an axial direction of the handrail main body 34 while rotating on its axis (move in a spiral manner).

The self-propelled device 54 is composed of: a set of three rolls 56 made of rubber (hereinafter referred to as "rubber rolls") as rolling members that protrude through openings 53A formed in a staggered manner in an inner circumferential wall 53 of the main body 52 and roll over the outer circumferential surface of the handrail main body 34 with sliding resistance (friction); and driving motors 58 that respectively rotate the rubber rolls 56 in both normal and reverse directions.

Figure 6:
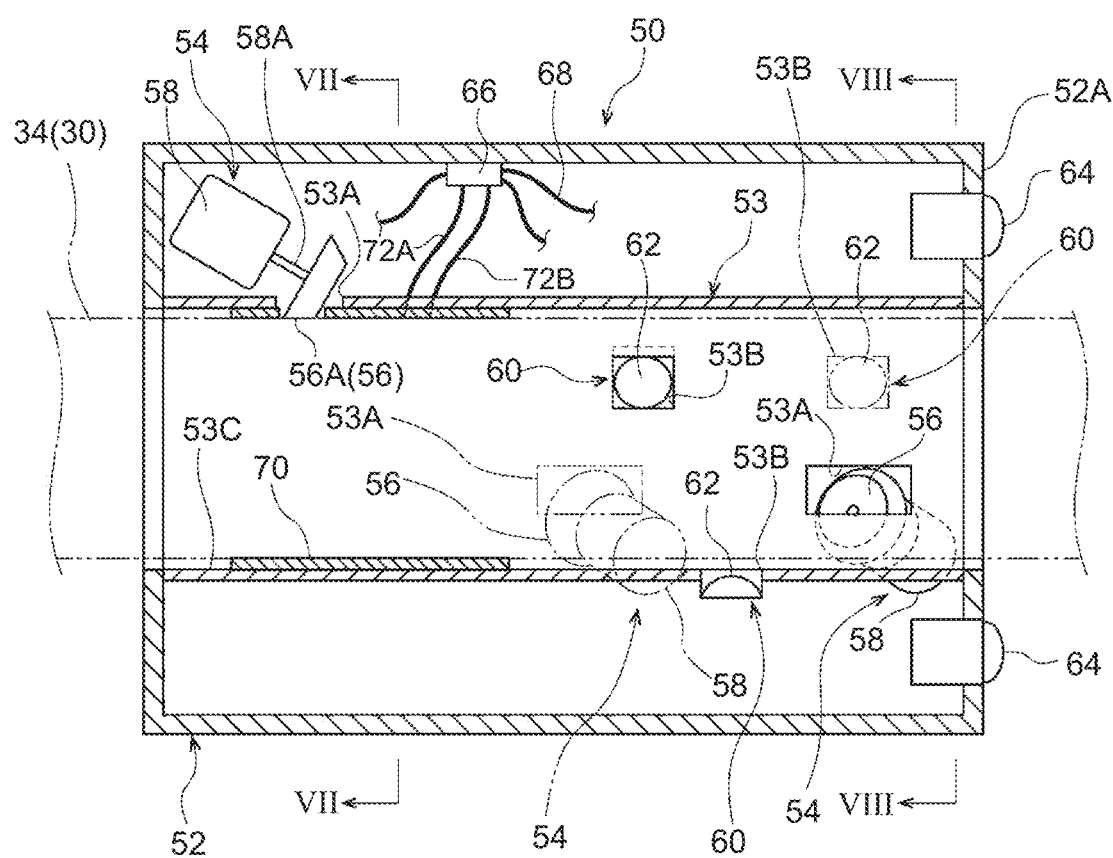
FIG. 6 is a sectional side view showing the cleaner fitted on the boarding handrail according to the first embodiment.

As shown in FIG. 6, the rubber rolls 56 have a truncated conical shape with a rotational axis direction oriented in a height direction, and slope surfaces 56A of the rubber rolls 56 come into (sliding) contact with the outer circumferential surface of the handrail main body 34. Since the rubber rolls 56 protrude through the openings 53A formed in a staggered manner in the inner circumferential wall 53 of the main body 52, the rubber rolls 56 are disposed in a staggered manner.

Figure 7:
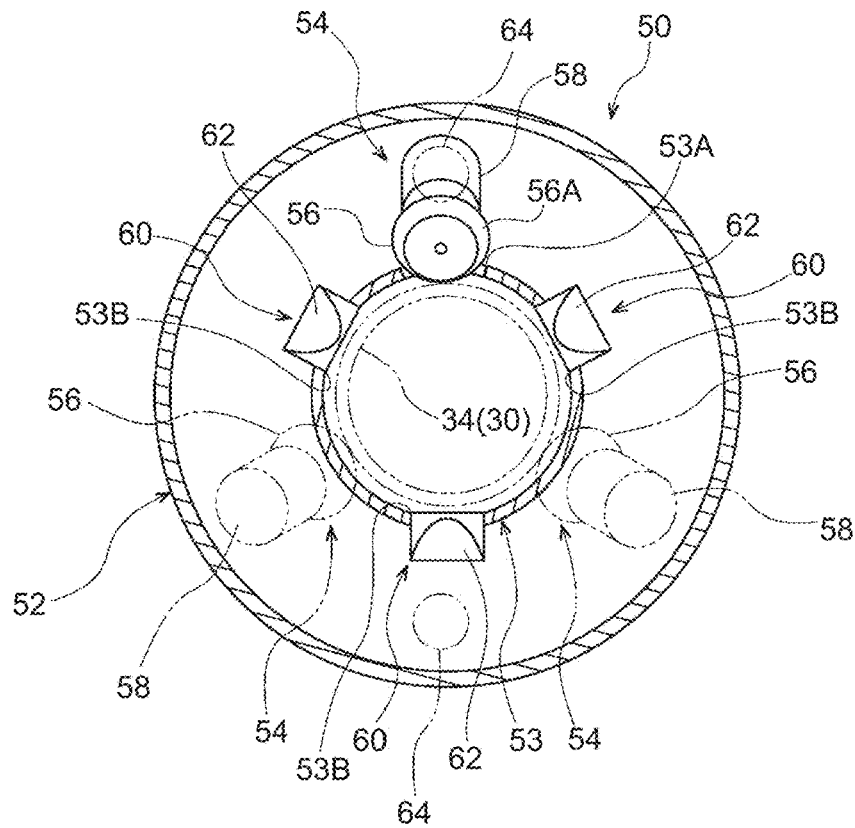
FIG. 7 is a sectional view taken along line VII-VII of FIG. 6 and seen in the arrow direction.

That is, the rubber rolls 56 are provided at positions different from one another in an axial direction and a circumferential direction of the main body 52, at equal intervals in the circumferential direction of the main body 52 when seen from the axial direction of the main body 52 (see FIG. 7). At least three rubber rolls 56 should be provided in the circumferential direction, and it is preferable that the slope surfaces 56A have no surface unevenness.

Each driving motor 58 is supported by a bracket (not shown), provided inside the main body 52, in a state of being inclined at a predetermined angle relative to the axial direction (an angle at which the slope surface 56A of the rubber roll 56 can be brought into contact with the outer circumferential surface of the handrail main body 34). A rotating shaft 58A of each driving motor 58 is coaxially fixed at a shaft center of the rubber roll 56. Thus, the rubber rolls 56 are synchronously rotated by a rotation driving force of the driving motors 58.

As shown in FIG. 6 and FIG. 7, an irradiation device 60 that irradiates the outer circumferential surface of the handrail main body 34 with ultraviolet light and thereby sterilizes (disinfects) the outer circumferential surface is provided inside the main body 52. The irradiation device 60 is composed of, for example, a plurality of ultraviolet light emitting elements (hereinafter referred to simply as "light emitting elements") 62, and the light emitting elements 62 are exposed through rectangular openings 53B that are formed in a staggered manner in the inner circumferential wall 53 of the main body 52.

That is, the light emitting elements 62 are provided at positions different from one another in the axial direction and the circumferential direction of the main body 52, at equal intervals in the circumferential direction of the main body 52 when seen from the axial direction of the main body 52 (with each light emitting element 62 located between the rubber rolls 56). Therefore, as the main body 52 moves over the handrail main body 34 in a spiral manner, the outer circumferential surface of the handrail main body 34 is irradiated with ultraviolet light evenly in the axial direction and the circumferential direction.

A state of the cleaner 50 being disposed on the side of the handrail main body 34 closer to the base 32 is an initial state of the cleaner 50, and a position of the cleaner 50 in the initial state is an initial position thereof. Therefore, the cleaner 50 is configured to first move from the side of the handrail main body 34 closer to the base 32 toward the leading end 34A and, upon reaching a predetermined position (e.g., the leading end 34A of the handrail main body 34), reverse the moving direction.

That is, switching the direction of a current applied to the power transmission line 26 can rotate the driving motors 58 in the reverse direction and thereby cause the cleaner 50 to return to the initial position. Thus, the cleaner 50 can sterilize (disinfect) the outer circumferential surface of the handrail main body 34 with ultraviolet light by moving back and forth over the handrail main body 34.

That the cleaner 50 has reached the leading end 34A of the handrail main body 34 is detected by, for example, as shown in FIG. 6, a plurality of (e.g., two) cameras 64 as position detection devices that are provided on an end surface 52A of the main body 52 on the side of the base 32. That the cleaner 50 has returned to the initial position on the side of the base 32 is also detected by the cameras 64. For example, two cameras 64 are provided 180 degrees opposite from each other along a radial direction of the main body 52.

Figure 8:
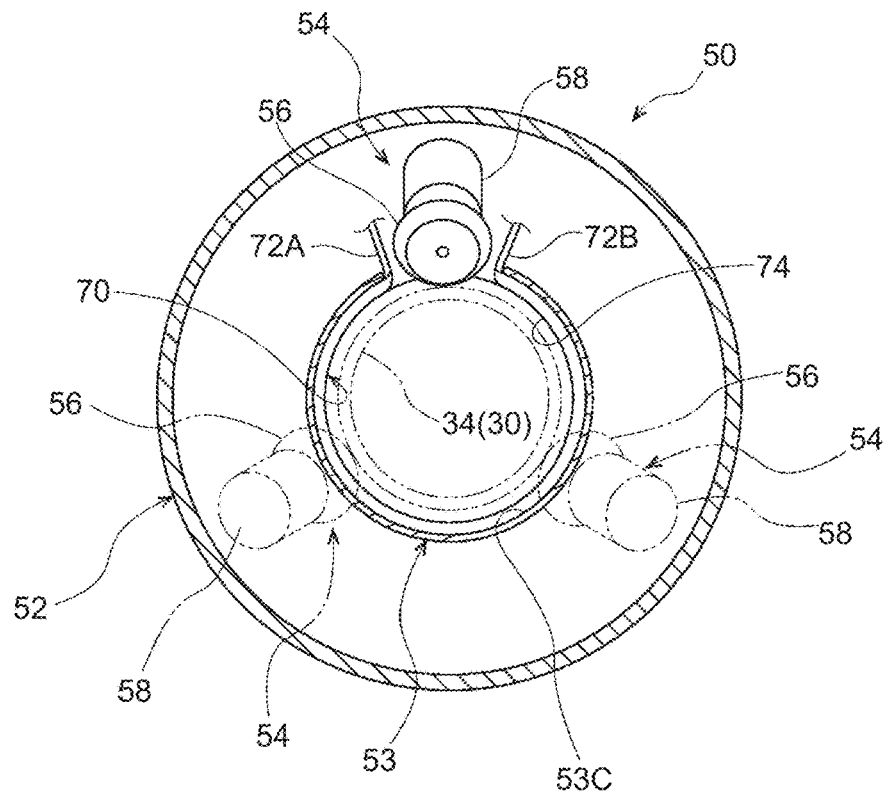
FIG. 8 is a sectional view taken along line VIII-VIII of FIG. 6 and seen in the arrow direction.
Figure 9:
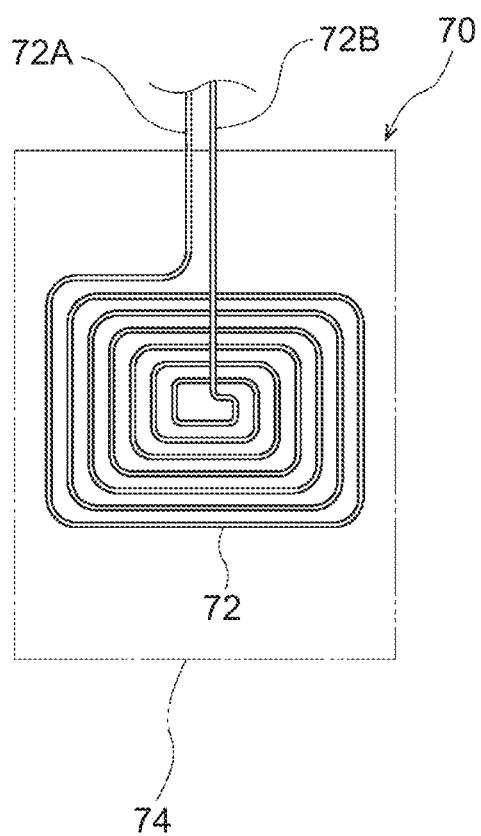
FIG. 9 is a development showing a power receiving coil member of the cleaner fitted on the boarding handrail according to the first embodiment.

As shown in FIG. 6 and FIG. 8, a power receiving coil member 70 is attached to a wall surface of the inner circumferential wall 53 of the main body 52 on a radially inner side (hereinafter referred to as an "inner surface 53C"), substantially along the entire circumference of the inner surface 53C. As shown in FIG. 9, the power receiving coil member 70 is composed of a power receiving part 72 that has a coil shape and a rectangular sheet 74 that holds the power receiving part 72, and the sheet 74 is attached to the inner surface 53C, substantially along the entire circumference of the inner surface 53C, with the power receiving part 72 facing the inner surface 53C.

In the power receiving coil member 70, an inducted electromotive force is excited by a magnetic field generated from the power transmission line 26 in a state of carrying a current that passes through the inside of the handrail main body 34. This induced electromotive force is used to wirelessly supply electricity to the driving motors 58 of the self-propelled device 54, the light emitting elements 62 of the irradiation device 60, and the cameras 64.

Specifically, as shown in FIG. 6, one end 72A and the other end 72B of the power receiving part 72 of the power receiving coil member 70 are connected to a distributor 66 that is provided inside the main body 52. Electricity is supplied from the distributor 66 to the driving motors 58, the light emitting elements 62, and the cameras 64 respectively through a plurality of cables 68 (of which only some are shown in FIG. 6).

Figure 10A:
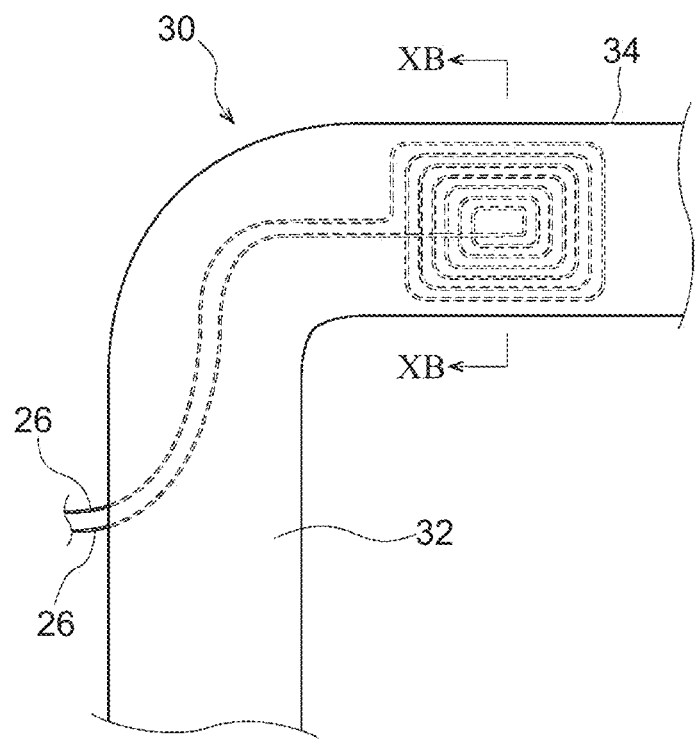
FIG. 10A is a side view showing another method to supply electricity to the cleaner fitted on the boarding handrail according to the first embodiment.
Figure 10B:
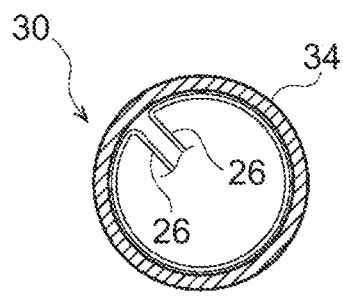
FIG. 10B is a sectional view taken along line XB-XB of FIG. 10A and seen in the arrow direction.

In a case where the cleaner 50 is equipped with a small battery (not shown) that can supply electricity to the driving motors 58, the light emitting elements 62, and the cameras 64, electricity may be supplied by a method as shown in FIG. 10A and FIG. 10B. That is, a power transmission line 26 having a coil shape may be attached to an inner circumferential surface of the handrail main body 34, along the entire circumference thereof, at the initial position of the cleaner 50. Thus, when the cleaner 50 is disposed at the initial position, the small battery is charged by an induced electromotive force from a magnetic field generated from the power transmission line 26 in a state of carrying a current.

Moving and stopping the cleaner 50 (rotating and stopping the driving motors 58 and turning on and turning off the light emitting elements 62) are controlled by a controller (not shown) that is provided in the bus 10. Specifically, when the controller recognizes that the entrance 16 has been closed by the sliding door 20, the controller applies a current to the power transmission line 26 and drives the driving motors 58 to move the cleaner 50 in the axial direction of the handrail main body 34 as well as turn on the light emitting elements 62.

When the controller recognizes that the entrance 16 is next opened by the sliding door 20, if the cleaner 50 is not disposed at the initial position, the controller applies a current to the power transmission line 26 to move the cleaner 50 to the initial position and then shuts off the current to the power transmission line 26. As a result, driving of the driving motors 58 stops and the cleaner 50 stops at the initial position, and the light emitting elements 62 are turned off.

This process (moving and stopping the cleaner 50) is repeated each time the entrance 16 is closed by the sliding door 20, so that the handrail main body 34 that has been grasped by passengers when getting on and off the bus 10 is always sterilized (disinfected) with ultraviolet light. The cleaner 50 may be stopped at the initial position not when the entrance 16 is next opened by the sliding door 20 but when a predetermined time has elapsed with the entrance 16 closed by the sliding door 20.

Next, the workings of the boarding handrail 30 according to the first embodiment configured as has been described above will be described.

Figure 11:
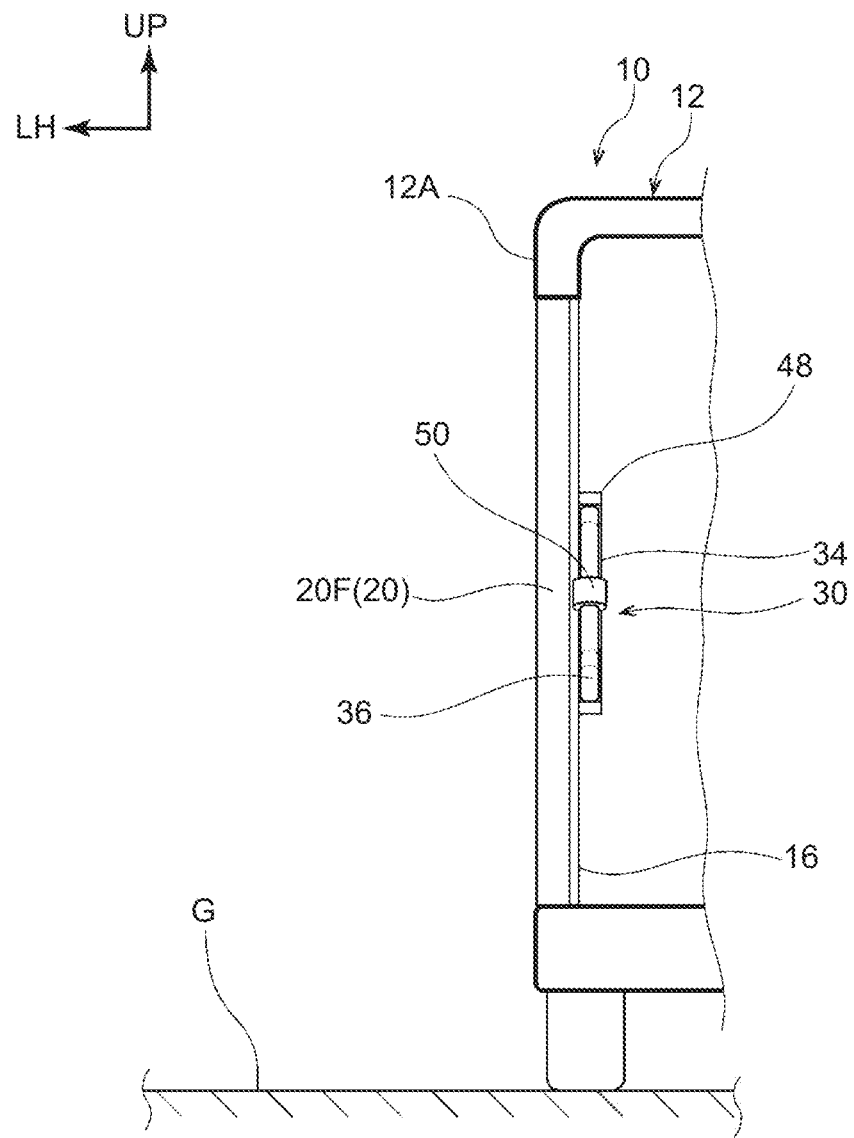
FIG. 11 is a rear view showing a retracted posture of the boarding handrail according to the first embodiment.
Figure 12:
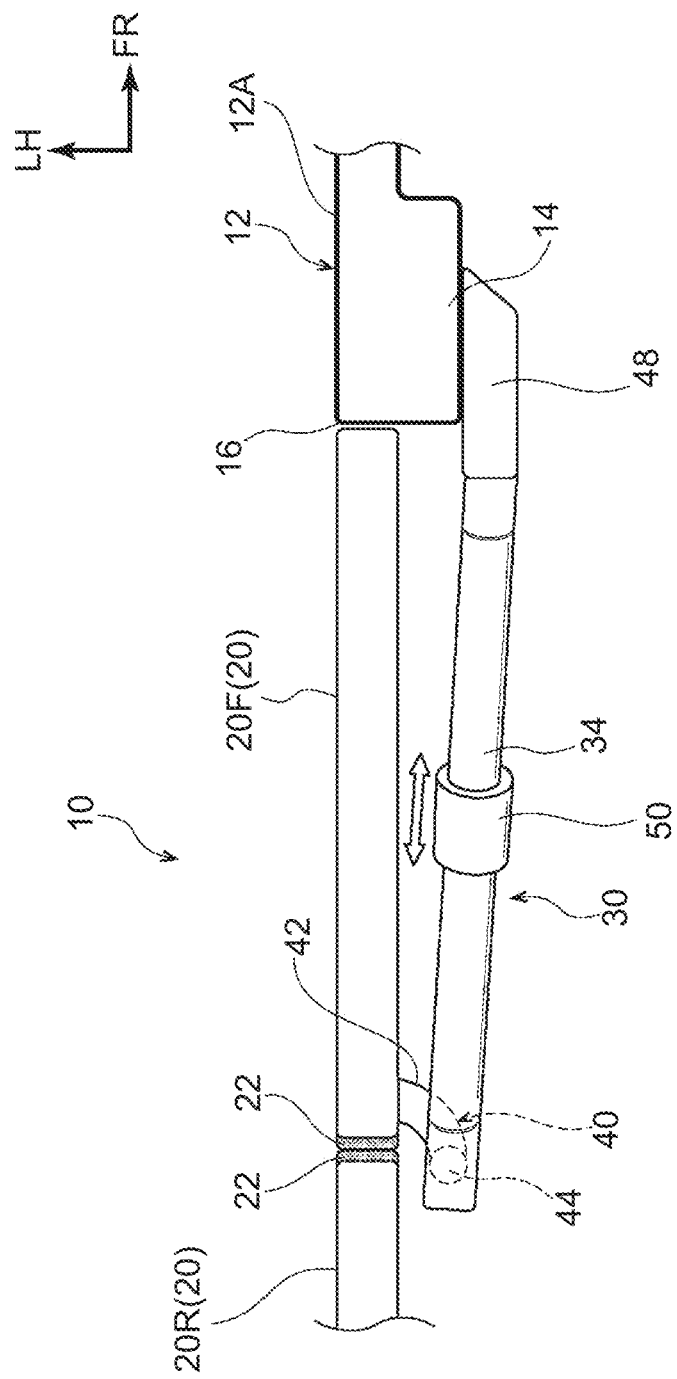
FIG. 12 is a plan view showing the retracted posture of the boarding handrail according to the first embodiment.

As shown in FIG. 11 and FIG. 12, when the entrance 16 is closed by the sliding door 20 (door halves 20F, 20R), the boarding handrail 30 is disposed almost along the sliding door 20 (the door half 20F in the case shown) as seen in a plan view. Specifically, when the entrance 16 is closed by the sliding door 20, the boarding handrail 30 assumes a retracted posture in which the sliding member 40 has slid toward the leading end 36A along the rail 36 and the handrail main body 34 and the rail 36 are disposed along the sliding door 20.

Thus, when the boarding handrail 30 assumes the retracted posture, the handrail main body 34 and the rail 36 do not protrude toward the inside of the vehicle (the vehicle cabin side). Therefore, especially in the small bus 10, when the boarding handrail 30 is provided, the boarding space is less restricted (as much boarding space as possible can be secured).

Figure 14:
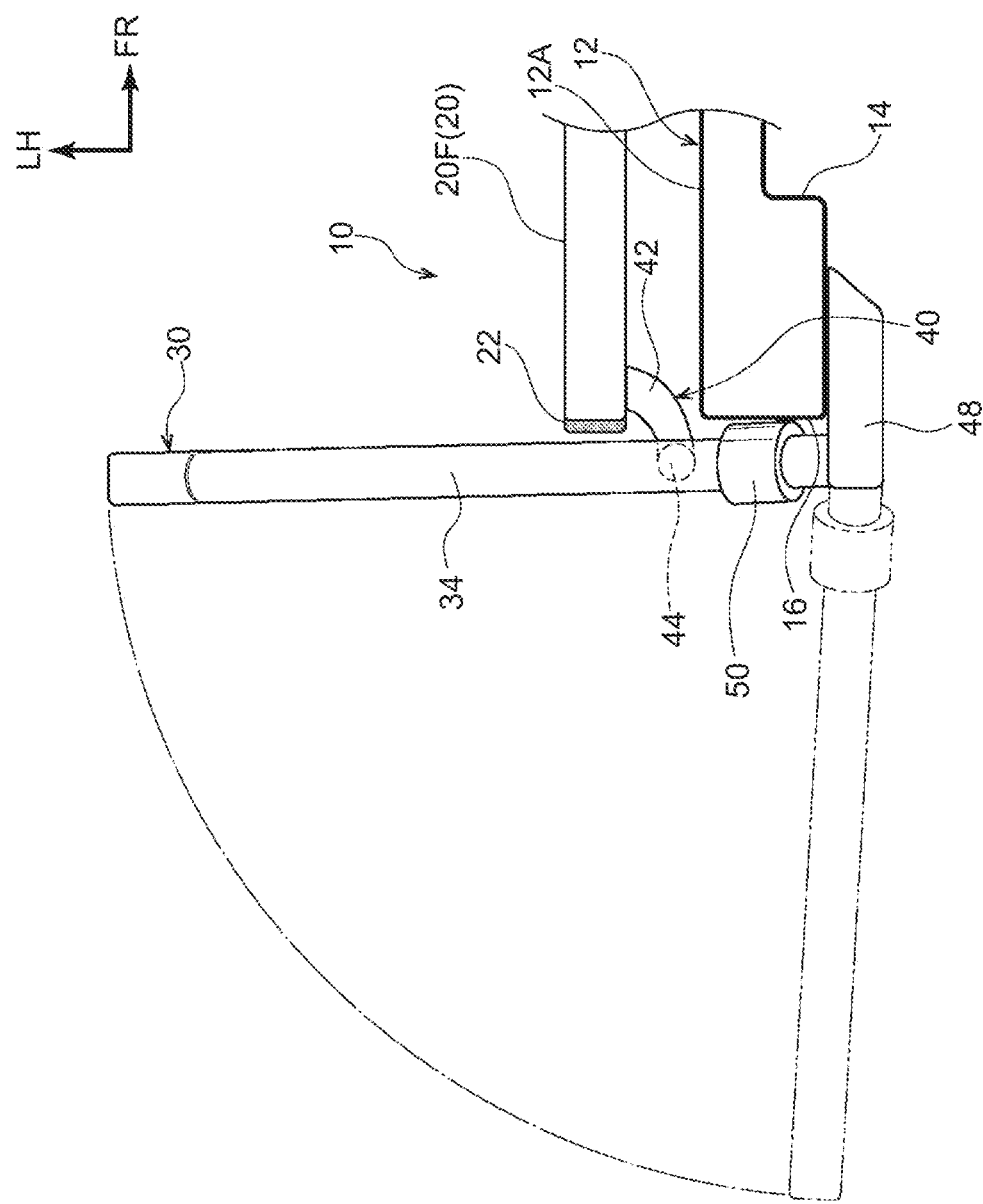
FIG. 14 is a plan view showing the deployed posture of the boarding handrail according to the first embodiment.

On the other hand, as shown in FIG. 13 and FIG. 14, when the entrance 16 is opened by the sliding door 20 (door halves 20F, 20R), the boarding handrail 30 protrudes toward the outside of the vehicle as seen in a plan view. Specifically, when the entrance 16 is opened by the sliding door 20, the boarding handrail 30 assumes a deployed posture in which the sliding member 40 has slid toward the base 32 along the rail 36 and the handrail main body 34 and the rail 36 protrude toward the outside of the vehicle (the outer side in the vehicle width direction).

Therefore, passengers can grasp the handrail main body 34 when getting on and off the bus 10 and thereby easily get on and off the bus 10 (with their posture stabilized). In particular, when getting off the bus 10, passengers momentarily stand on one foot while putting the other foot down. If the handrail main body 34 is present on the front side in their advancing direction, it helps passengers stand firmly on one foot and further stabilize their posture. Since the handrail main body 34 has a circular shape in cross-section, passengers can easily grasp the handrail main body 34 compared with when the handrail main body 34 has a rectangular shape in cross-section, for example.

Moreover, the handrail main body 34 extends from the upper part of the base 32 toward the obliquely lower side. In the case of the bus 10 provided with the slope 18 under the entrance 16, for example, the inclination angle θ1 of the slope 18 and the inclination angle θ2 of the handrail main body 34 can be set to nearly equal angles (so as to make the slope 18 and the handrail main body 34 substantially parallel to each other as seen in a rear view). Thus, when getting on and off the bus 10 using the slope 18, passengers can change the level of their fingers as the level of their body changes, which allows them to easily get on and off the bus 10 while grasping the handrail main body 34 (with their posture further stabilized).

When the boarding handrail 30 assumes the deployed posture, a clearance large enough to insert a finger is left between the handrail main body 34 and the elastic body 22 attached to the end surface of the door half 20F on the inner side in the front-rear direction. Therefore, even when a passenger inserts a finger between the handrail main body 34 and the elastic body 22 (touches the elastic body 22 with a finger) when getting on or off the bus 10 while grasping the handrail main body 34, that finger is unlikely to get hurt. Thus, the safety of passengers is secured.

When the controller recognizes that the entrance 16 has been closed by the sliding door 20, the controller performs control to apply a current to the power transmission line 26. Then, an induced electromotive force is excited in the power receiving coil member 70, and this induced electromotive force causes the cleaner 50 to move over the handrail main body 34 from the initial position on the side of the base 32 toward the leading end 34A.

Specifically, the driving motors 58 of the self-propelled device 54 are driven to rotate and the rubber rolls 56 roll over the outer circumferential surface of the handrail main body 34. Accordingly, the cleaner 50 moves in the axial direction of the handrail main body 34 while rotating on its axis (moves in a spiral manner). At the same time as the cleaner 50 starts to move, the light emitting elements 62 of the irradiation device 60 disposed in a staggered manner are turned on.

Therefore, as the cleaner 50 moves, the outer circumferential surface of the handrail main body 34 is irradiated with ultraviolet light evenly in the circumferential direction and the axial direction. As a result, the outer circumferential surface of the handrail main body 34 is sterilized (disinfected). Thus, passengers who get on and off the bus 10 next can grasp the handrail main body 34 that is always sterilized, and can feel at ease about using the handrail main body 34.

In particular, passengers riding the bus 10 can see and learn that the handrail main body 34 is sterilized with ultraviolet light, so that they can set their mind at ease about using the handrail main body 34 and grasp the handrail main body 34 without hesitation (at ease). This can further enhance the safety of passengers during getting off the bus 10.

When the controller recognizes via the cameras 64 that the cleaner 50 is reaching the leading end 34A of the handrail main body 34, the controller performs control to reverse the direction of the current applied to the power transmission line 26. Thus, the driving motors 58 are driven to rotate in the reverse direction, causing the cleaner 50 to move from the side of the leading end 34A of the handrail main body 34 toward the base 32. Also during this process, the light emitting elements 62 remain in the turned-on state.

Thus, the cleaner 50 can sterilize (disinfect) the outer circumferential surface of the handrail main body 34 by irradiating the outer circumferential surface with ultraviolet light while moving back and forth in a spiral manner. Therefore, the outer circumferential surface of the handrail main body 34 is uniformly sterilized (disinfected), and the likelihood that the outer circumferential surface may partially fail to be sterilized (disinfected) can be reduced or eliminated.

The self-propelled device 54, the irradiation device 60, etc. are wirelessly supplied with electricity through the power transmission line 26 and the power receiving coil member 70. Thus, compared with when the self-propelled device 54 is supplied with electricity from a battery, for example, there is no need to worry about a dead battery. Further, compared with the configuration in which the cleaner 50 is equipped with a battery, this configuration can supply electricity without requiring the cleaner 50 to be equipped with a battery, and therefore can simplify the configuration of the cleaner 50 and reduce the weight of the cleaner 50 itself.

The power receiving coil member 70 (the sheet 74 having the power receiving part 72) is attached to the inner surface 53C of the inner circumferential wall 53 of the main body 52, substantially along the entire circumference thereof. Thus, compared with when the power receiving coil member 70 is attached to the inner surface 53C, along only a part of the circumference thereof, the cleaner 50 need not be positioned in the circumferential direction (rotation direction) to supply electricity.

When the power receiving coil member 70 is disposed on the inner surface 53C of the inner circumferential wall 53 of the main body 52, loss of a magnetic field to be received is reduced compared with when the power receiving coil member 70 is disposed on a wall surface of the inner circumferential wall 53 of the main body 52 on a radially outer side (hereinafter referred to as an "outer surface"; the same applies to an outer circumferential wall 55 to be described later). Thus, an induced electromotive force is efficiently excited.

When the controller recognizes that the entrance 16 is next opened by the sliding door 20 after disinfection by the cleaner 50, the controller performs control to shut off the current applied to the power transmission line 26. This configuration can reduce battery consumption compared with a configuration in which a current is applied to the power transmission line 26 and the cleaner 50 is moved also when the entrance 16 is opened by the sliding door 20.

If the cleaner 50 is not disposed at the initial position when the controller recognizes that the entrance 16 is next opened by the sliding door 20, the controller performs control to move the cleaner 50 to the initial position and then shut off the current applied to the power transmission line 26.

Thus, the cleaner 50 is moved only when the entrance 16 is closed by the sliding door 20 (only when the boarding handrail 30 has assumed the retracted posture). In other words, the cleaner 50 remains stationary at the initial position while the entrance 16 is opened by the sliding door 20 (when the boarding handrail 30 has assumed the deployed posture).

Therefore, passengers getting on and off the bus 10 can grasp the handrail main body 34 of the boarding handrail 30 from various directions, without the cleaner 50 interfering with their action of grasping the handrail main body 34. Thus, the function of a boarding handrail 30 is not hindered despite the configuration in which the irradiation device 60 capable of emitting ultraviolet light is provided on the handrail main body 34 of the boarding handrail 30.

The boarding handrail 30 is not limited to the configuration in which it is provided only on the side of one door half (e.g., the door half 20F) of the sliding door 20. A configuration in which the boarding handrail 30 is provided on both sides of one door half (e.g., the door half 20F) and the other door half (e.g., the door half 20R) of the sliding door 20 may be adopted.

In this case, the boarding handrail 30 provided on the side of the door half 20R is disposed so as to be offset in the up-down direction from the boarding handrail 30 provided on the side of the door half 20F. This is because, due to the structure of the boarding handrail 30, the leading end 34A of the handrail main body 34 and the leading end 36A of the rail 36 provided on the side of the door half 20F protrude toward the door half 20R while the leading end 34A of the handrail main body 34 and the leading end 36A of the rail 36 provided on the side of the door half 20R protrude toward the door half 20F.

That the base 32, the handrail main body 34, and the rail 36 provided on the side of the door half 20R are thus offset in the up-down direction from the base 32, the handrail main body 34, and the rail 36 provided on the side of the door half 20F has an advantage in that passengers of various heights can select the handrail main body 34 that suits their own height. Of course, the sliding members 40 respectively mounted on the door halves 20F, 20R are also disposed so as to be offset from each other in the up-down direction according to the positions of the boarding handrails 30.

Second Embodiment

Next, a second embodiment will be described. Parts of the second embodiment that are equivalent to those of the first embodiment will be denoted by the same reference signs and a detailed description thereof will be omitted as appropriate.

Figure 15:
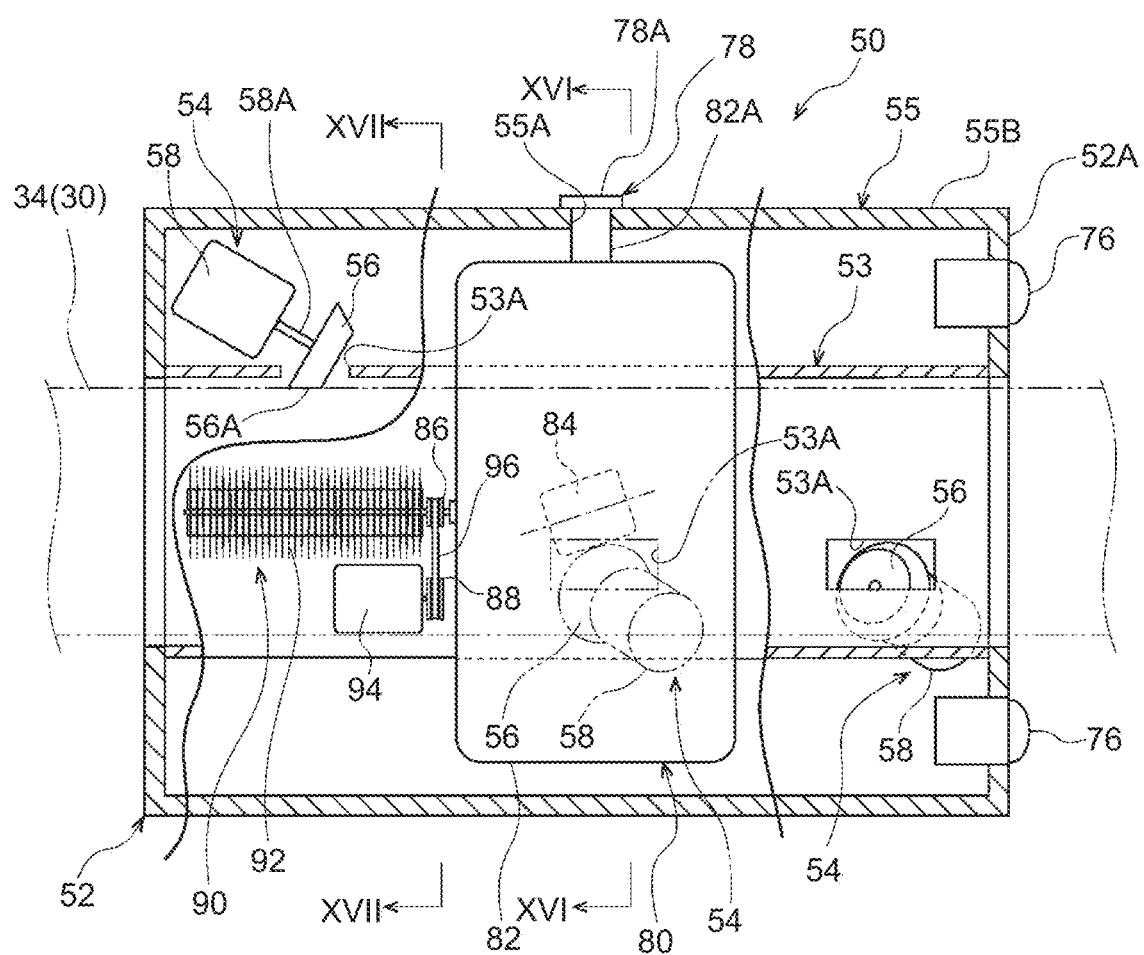
FIG. 15 is a sectional side view showing a cleaner fitted on a boarding handrail according to a second embodiment.
Figure 16:
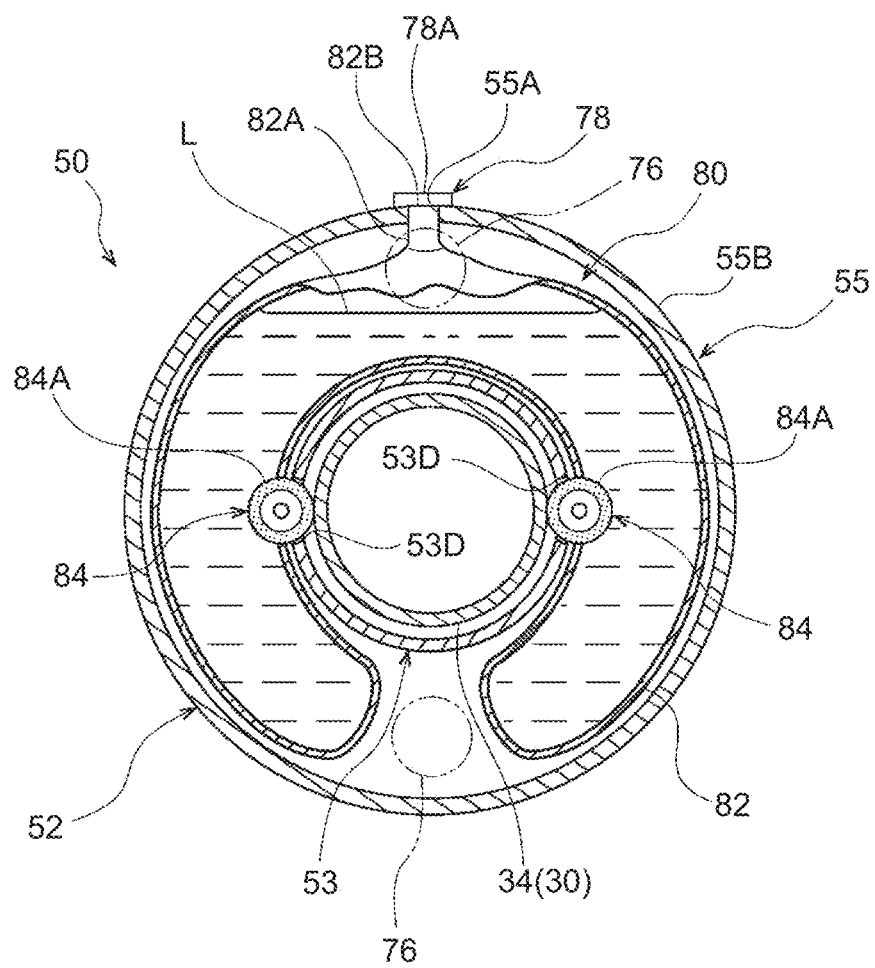
FIG. 16 is a sectional view taken along line XVI-XVI of FIG. 15 and seen in the arrow direction.
Figure 17:
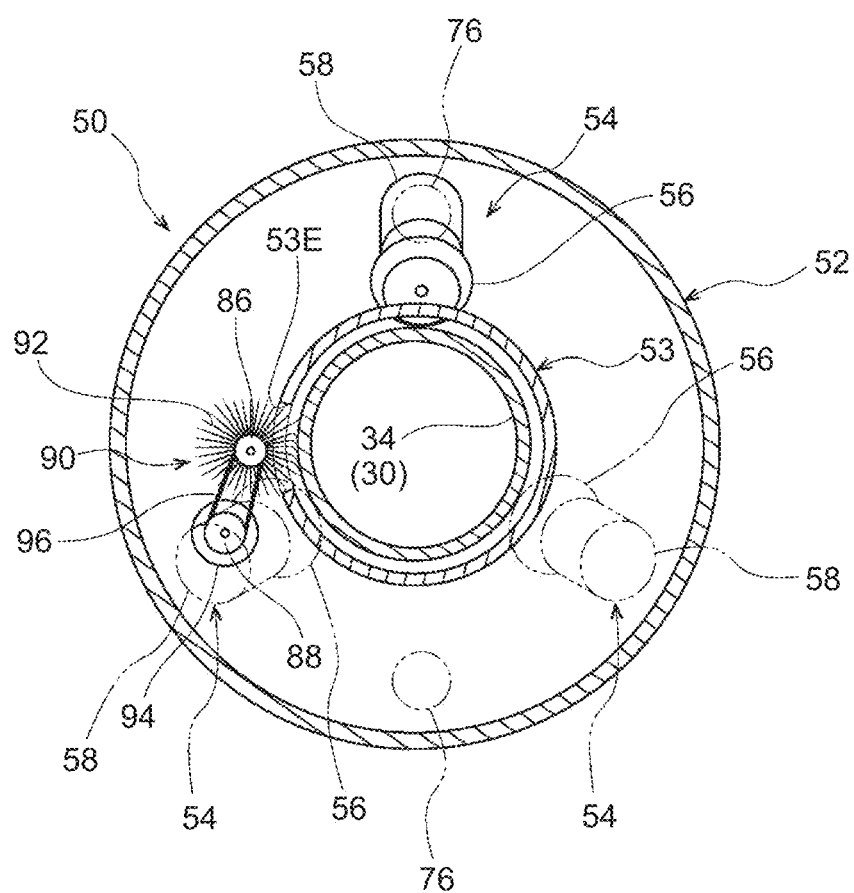
FIG. 17 is a sectional view taken along line XVII-XVII of FIG. 15 and seen in the arrow direction.

As shown in FIG. 15 to FIG. 17, the boarding handrail 30 according to the second embodiment differs from that of the first embodiment in that, instead of the irradiation device 60 that emits ultraviolet light, a supply device 80 that supplies a disinfectant liquid, such as alcohol, and a wiping device 90 that wipes the outer circumferential surface of the handrail main body 34 before the disinfectant liquid is supplied to the outer circumferential surface are provided inside the main body 52 constituting a part of the cleaner 50. In FIG. 15, the power receiving coil member 70, the distributor 66, etc. are not shown.

As shown in FIG. 15 and FIG. 16, the supply device 80 has a tank 82 that stores a disinfectant liquid L, and a pair of spreading rolls 84 that are rotatably supported on parts of the tank 82 on the side of the inner circumferential wall 53, with a rotational axis direction oriented in the axial direction of the main body 52, and that apply the disinfectant liquid L inside the tank 82 to the outer circumferential surface of the handrail main body 34.

The tank 82 has a substantially C-shape as seen from the axial direction of the main body 52, and a cylindrical inlet 82A through which the disinfectant liquid L is poured into the tank 82 is formed at a central part of the tank 82 in a circumferential direction. An opening 55A through which the inlet 82A is exposed (to be more exact, through which an end surface 82B of the inlet 82A protrudes to a position at which the end surface 82B is flush with an outer surface 55B of the outer circumferential wall 55) is formed in the outer circumferential wall 55 of the main body 52, and the inlet 82A exposed through the opening 55A can be closed by a cap 78.

The cap 78 has a substantially T-shape as seen from the axial direction of the main body 52, with a columnar part (not shown) integrally provided so as to protrude at the center of a lower surface of a disc part 78A that has a larger diameter than the columnar part, and the outside diameter of the columnar part is slightly larger than the inside diameter of the inlet 82A. Thus, the columnar part of the cap 78 can be tightly fitted into the inlet 82A of the tank 82, and the inlet 82A can be closed by the cap 78.

An outer circumferential part 84A of each spreading roll 84 is formed by an elastic body, such as sponge, and the spreading rolls 84 are slightly inclined relatively to the axial direction of the main body 52. Specifically, as seen from a direction orthogonal to the axial direction, an axial direction of a rotating shaft 84B of each spreading roll 84 is a direction orthogonal to the advancing direction of the cleaner 50 that moves in a spiral manner. This helps the spreading rolls 84 rotate so as to follow the movement of the cleaner 50 as will be described later (in other words, makes it less likely that the spreading rolls 84 create resistance to the movement of the cleaner 50).

Portions of the respective outer circumferential parts 84A of the spreading rolls 84 protrude through openings 53D formed at portions of the inner circumferential wall 53 of the main body 52 that face each other (are 180 degrees opposite from each other), and come into (sliding) contact with the outer circumferential surface of the handrail main body 34. Portions of the respective outer circumferential parts 84A of the spreading rolls 84 on the opposite side from the portions protruding through the openings 53D are disposed inside the tank 82.

Therefore, as the main body 52 rotates on its axis, the outer circumferential parts 84A of the spreading rolls 84 are rotated so as to follow the rotation of the main body 52 while remaining in contact with the outer circumferential surface of the handrail main body 34, and thereby apply the disinfectant liquid L to the outer circumferential surface. The spreading rolls 84 are not limited to the configuration of being driven to rotate by following the rotation of the main body 52 on its axis, and may instead be configured to be driven to rotate by a driving motor (not shown).

As shown in FIG. 15 and FIG. 17, the wiping device 90 has: a brush 92 that is rotatably supported on a wall of the tank 82 facing the leading end 34A, with a rotational axis direction oriented in the axial direction of the main body 52; a driving motor 94 that drives the brush 92 to rotate; and a transmission belt 96 that is wrapped between a pulley 86 that is coaxially fixed on a rotating shaft 92A of the brush 92 and a pulley 88 that is coaxially fixed on a rotating shaft 94A of the driving motor 94.

The driving motor 94 is supported on the main body 52 through a bracket (not shown). A part of the brush 92 protrudes through an opening 53E formed in the inner circumferential wall 53 of the main body 52 and comes into (sliding) contact with the outer circumferential surface of the handrail main body 34. Thus, as the main body 52 rotates on its axis, the brush 92 driven to rotate by the driving motor 94 wipes the outer circumferential surface of the handrail main body 34 while coming into contact with the outer circumferential surface.

The opening 53E is formed on the side of the leading end 34A relatively to the opening 53D (on a downstream side in the moving direction of the cleaner 50 when it moves toward the leading end 34A). Thus, the brush 92 wipes the outer circumferential surface of the handrail main body 34 before the disinfectant liquid L is supplied to the outer circumferential surface. To enhance the effect of wiping the outer circumferential surface of the handrail main body 34, it is preferable that the rotation direction of the brush 92 be reverse to the direction of rotation of the main body 52 on its axis.

As shown in FIG. 15, separately from the cameras 64, a plurality of (e.g., two) cameras 76 as detection devices are provided on the end surface 52A of the main body 52 on the side of the base 32. (The cameras 64 are not shown.) The cameras 76 detect contamination of the outer circumferential surface of the handrail main body 34, and for example, two cameras 76 are provided 180 degrees opposite from each other along the radial direction of the main body 52.

The cleaner 50 is configured to return to the initial position when contamination of the outer circumferential surface of the handrail main body 34 is no longer detected by the cameras 76. Specifically, based on a detection result of the cameras 76, the controller applies a current to the power transmission line 26 and thereby rotates the driving motors 58 in the reverse direction and returns the cleaner 50 to the initial position. The cameras 76 may be used also as the cameras 64 that are position detecting devices, and in this case, the cameras 64 can be omitted.

Next, the workings of the boarding handrail 30 according to the second embodiment configured as has been described above will be described. The description of workings that are the same as workings of the boarding handrail 30 according to the first embodiment will be omitted as appropriate.

When the controller recognizes that the entrance 16 has been closed by the sliding door 20, the controller performs control to apply a current to the power transmission line 26. Then, an induced electromotive force is excited in the power receiving coil member 70, and this induced electromotive force causes the cleaner 50 to move over the handrail main body 34 from the initial position on the side of the base 32 toward the leading end 34A.

Specifically, the driving motors 58 of the self-propelled device 54 are driven to rotate and the rubber rolls 56 roll over the outer circumferential surface of the handrail main body 34. Accordingly, the cleaner 50 moves in the axial direction of the handrail main body 34 while rotating on its axis (moves in a spiral manner). Then, the outer circumferential parts 84A of the spreading rolls 84 rotate so as to follow the rotation of the cleaner 50 (on its axis).

Therefore, as the cleaner 50 moves in a spiral manner, the disinfectant liquid L is applied to the outer circumferential surface of the handrail main body 34 evenly in the circumferential direction and the axial direction. As a result, the outer circumferential surface of the handrail main body 34 is sterilized (disinfected). Thus, passengers who get on and off the bus 10 next can grasp the handrail main body 34 that is always sterilized, and can feel at ease about using the handrail main body 34.

Before the disinfectant liquid L is applied by the spreading rolls 84, the outer circumferential surface of the handrail main body 34 is wiped by the brush 92 that is driven to rotate. Thus, the disinfectant liquid L can be effectively applied (supplied) to the outer circumferential surface of the handrail main body 34 from which contamination has been removed.

When the controller recognizes via the cameras 64 that the cleaner 50 is reaching the leading end 34A of the handrail main body 34, the controller performs control to reverse the direction of the current applied to the power transmission line 26. Thus, the driving motors 58 are driven to rotate in the reverse direction and the cleaner 50 moves from the side of the leading end 34A of the handrail main body 34 toward the base 32.

Also during this process, the disinfectant liquid L is applied to the outer circumferential surface of the handrail main body 34 by the outer circumferential parts 84A of the spreading rolls 84. Thus, like the cleaner 50 according to the first embodiment, the cleaner 50 according to the second embodiment can sterilize (disinfect) the outer circumferential surface of the handrail main body 34 while moving back and force in a spiral manner. Therefore, the outer circumferential surface of the handrail main body 34 is uniformly sterilized (disinfected), and the likelihood that the outer circumferential surface may partially fail to be sterilized (disinfected) can be reduced or eliminated.

It is preferable that when the cleaner 50 moves from the side of the leading end 34A of the handrail main body 34 toward the base 32, the current applied to the driving motor 94 be shut off to reduce the intensity of wiping of the outer circumferential surface of the handrail main body 34 by the brush 92. Thus, the disinfectant liquid L applied to the outer circumferential surface of the handrail main body 34 is less likely to be wiped off by the brush 92.

While contamination of the outer circumferential surface of the handrail main body 34 is detected by the cameras 76, the cleaner 50 moves back and force repeatedly. However, when contamination of the outer circumferential surface of the handrail main body 34 is no longer detected by the cameras 76, the controller performs control to cause the cleaner 50 to return to the initial position and stop. Thus, unnecessary movement of the cleaner 50 can be prevented and battery consumption can be reduced.

Also the cleaner 50 according to the second embodiment moves only when the entrance 16 is closed by the sliding door 20 (only when the boarding handrail 30 has assumed the retracted posture). In other words, the cleaner 50 remains stationary at the initial position while the entrance 16 is opened by the sliding door 20 (when the boarding handrail 30 has assumed the deployed posture).

Therefore, passengers getting on and off the bus 10 can grasp the handrail main body 34 of the boarding handrail 30 from various directions, without the cleaner 50 interfering with their action of grasping the handrail main body 34. Thus, the function of a boarding handrail 30 is not hindered despite the configuration in which the supply device 80 capable of supplying the disinfectant liquid L and others are provided on the handrail main body 34 of the boarding handrail 30.

While the boarding handrails 30 according to the embodiments have been described above based on the drawings, the boarding handrails 30 according to the embodiments are not limited to those shown in the drawings, and design changes can be made thereto as necessary within the scope of the gist of the present disclosure. For example, the initial position of the cleaner 50 may be on the side of the leading end 34A, instead of the side of the handrail main body 34 closer to the base 32.

The position detection device is not limited to the camera 64 and may instead be formed by, for example, a sensor that can detect the distance to an object. When the leading end 34A of the handrail main body 34 is bent substantially 90 degrees downward and extends over a predetermined length, for example, the cleaner 50 may be configured to pass that bend and move to the lower side.

The support member that turnably supports the boarding handrail 30 is not limited to the configuration using the hinges 24 shown in the drawings, and an arbitrary configuration may be adopted as long as it does not interfere with routing of the power transmission line 26. The irradiation device 60 is not limited to a device composed of a plurality of light emitting elements 62, and may have any configuration as long as the irradiation device 60 can emit ultraviolet light.

Of the parts of the cleaner 50, at least the self-propelled device 54 should be wirelessly supplied with electricity. For the irradiation device 60 (light emitting elements 62), the wiping device 90 (driving motor 94), etc., for example, a battery holder (not shown) may be provided inside the main body 52 and electricity may be supplied to these devices from a plurality of batteries (not shown) housed inside this battery holder.

In the second embodiment, when there is extra space (installation space) inside the main body 52, the irradiation device 60 (light emitting elements 62) that emits ultraviolet light may be additionally provided. In the second embodiment, the method to supply the disinfectant liquid L to the outer circumferential surface of the handrail main body 34 is not limited to application by the spreading rolls 84 but may instead be, for example, spraying by a spraying device (not shown).

Application of a current to the power transmission line 26 is not limited to the configuration in which it is triggered by the controller's recognizing that the sliding door 20 has closed. For example, a configuration in which application of a current is triggered by operation of a switch for closing the sliding door 20 performed by a driver of the bus 10 may be adopted. However, the configuration in which application of a current is triggered by the controller's recognizing that the sliding door 20 has closed can be applied to a self-driving bus on which no driver is present.

What is claimed is:

1. A boarding handrail comprising:
   a base supported by a support member provided on a periphery of an entrance of a vehicle;
   a handrail main body provided on the base and capable of being grasped by a passenger who gets on or off the vehicle through the entrance; and
   a moving member movably fitted on the handrail main body, wherein
   the moving member has:
   a self-propelled device that rolls over an outer circumferential surface of the handrail main body to cause the moving member to move in an axial direction while rotating on its axis; and
   an irradiation device that irradiates the outer circumferential surface of the handrail main body with ultraviolet light.

2. A boarding handrail comprising:
   a base supported by a support member provided on a periphery of an entrance of a vehicle;
   a handrail main body provided on the base and capable of being grasped by a passenger who gets on or off the vehicle through the entrance; and
   a moving member movably fitted on the handrail main body, wherein
   the moving member has:
   a self-propelled device that rolls over an outer circumferential surface of the handrail main body to cause the moving member to move in an axial direction while rotating on its axis; and
   a supply device that supplies a disinfectant liquid to the outer circumferential surface of the handrail main body.

3. The boarding handrail according to claim 2, wherein the moving member has a wiping device that wipes the outer circumferential surface of the handrail main body before the disinfectant liquid is supplied to the outer circumferential surface.

4. The boarding handrail according to claim 3, wherein the moving member has a detection device that detects contamination of the outer circumferential surface of the handrail main body, and the moving member is configured to return to an initial position when the contamination is no longer detected by the detection device.

5. The boarding handrail according to claim 1, wherein the moving member is configured to reverse a moving direction upon reaching a predetermined position on the handrail main body.

6. The boarding handrail according to claim 1, wherein the boarding handrail is configured such that at least the self-propelled device is wirelessly supplied with electricity through a power transmission member that is passed through the base and the handrail main body.

7. The boarding handrail according to claim 1, wherein:
the support member supports the base so as to allow the base to turn with an axial direction oriented in a vehicle body up-down direction; and
the handrail main body is configured to protrude toward an outside of the vehicle by turning around a rotating shaft of the support member as a door acts to open the entrance, and to be housed inside the vehicle by turning around the rotating shaft of the support member as the door acts to close the entrance.

8. The boarding handrail according to claim 2, wherein the moving member is configured to reverse a moving direction upon reaching a predetermined position on the handrail main body.

9. The boarding handrail according to claim 2, wherein the boarding handrail is configured such that at least the self-propelled device is wirelessly supplied with electricity through a power transmission member that is passed through the base and the handrail main body.

10. The boarding handrail according to claim 2, wherein:
the support member supports the base so as to allow the base to turn with an axial direction oriented in a vehicle body up-down direction; and
the handrail main body is configured to protrude toward an outside of the vehicle by turning around a rotating shaft of the support member as a door acts to open the entrance, and to be housed inside the vehicle by turning around the rotating shaft of the support member as the door acts to close the entrance.

\* \* \* \* \*